Figure 1:
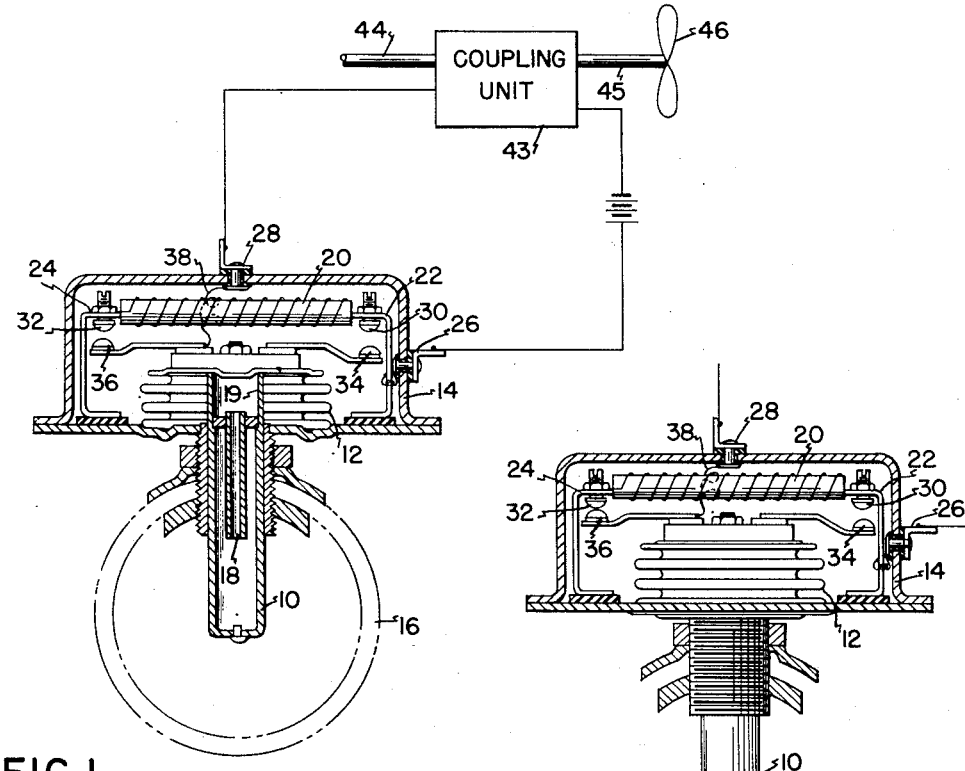

March 6, 1951 J. E. WOODS 2,544,208
THERMOSTATIC CONTROL DEVICE
Filed Feb. 7, 1948

INVENTOR.
JOHN E. WOODS
BY
ATTORNEYS

Patented Mar. 6, 1951

2,544,208

UNITED STATES PATENT OFFICE 2,544,208

THERMOSTATIC CONTROL DEVICE

John E. Woods, Cohasset, Mass., assignor to Standard-Thomson Corporation, Boston, Mass., a corporation of Delaware Application February 7, 1948, Serial No. 6,934

2 Claims. (Cl. 201—48)

The present invention relates to thermostatic control devices and more particularly to thermostatic control devices for controlling the speed of an automotive fan.

The conventional method of driving the fan from the crank shaft through a belt has been found objectionable, since the fan absorbs considerable power at the higher speeds. At high engine speeds, full speed operation of the fan is not necessary because of the ram effect of the vehicle pushing through the air. It has recently been proposed to effect an electromagnetic coupling between the engine and the fan, this coupling being controlled thermostaticaly whereby the fan is operated at low speed or is cut off altogether when the water is below a certain temperature and at higher speed as the water temperature rises. The electromagnetic coupling may take any form such as a motor-generator or similar system but preferably comprises a variable slip device including a rheostat which is controlled by the thermostatic devices. It has been customary to use a pressure-responsive rheostat, such as a carbon pile, in order that a smooth control may be obtained. Such a system, however, is not inherently one that will fail safe; in other words, failure of pressure due to loss of liquid from the thermostat will operate to stop the fan, although in my copending application Serial No. 6,933, filed of even date herewith, now Patent 2,520,894, issued August 29, 1950, I have described a system using a pressure-responsive resistor, in which "fail-safe" operation is effected. In any event, the carbon pile device and its associated elements are frequently too expensive for general use.

The principal object of the present invention is to provide a system of automotive fan control, whereby adequate control may be attained without the expense of the pressure-responsive resistor and which will provide for proper fail-safe operation in the event of loss of fluid from the thermostat.

To this end the present invention makes use of a simple wire-wound resistor, together with means for successively cutting out sections thereof out of circuit. By this arrangement, a step control rather than a continuous control of the fan is obtained but it was found that is adequate for most purposes, even with only two speeds. Furthermore, since a large positive pressure is not required, as would be the case for compression of a pile, the thermostatic unit is perferably operated on the vacuum side, whereby upon failure of the thermostat, as by loss of fluid, the system will automatically assume a fail-safe condition.

Other features of the invention consist of certain novel features of construction, combinations and arrangements of parts hereinafter described and particularly defined in the claims.

Figure 2:
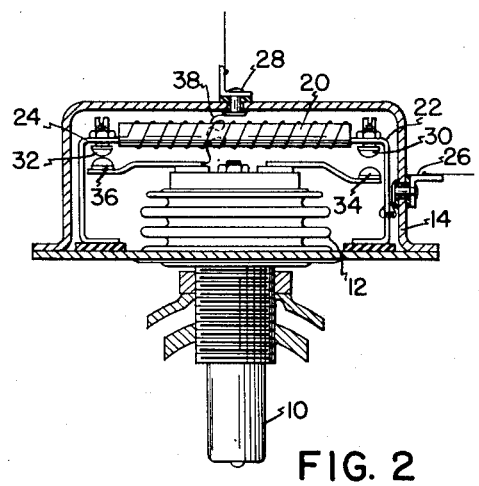

In the accompanying drawings, Fig. 1 is a sectional elevation of the preferred apparatus of the present invention embodied in system of automotive fan control; Fig. 2 shows the unit at an intermediate temperature and Fig. 3 at a higher temperature.

The construction shown in Fig. 1 comprises a bulb 10 and an expansible chamber indicated as a bellows 12, the latter being enclosed in a metal casing 14. The tube 10 is adapted to be clamped within some part of water circulating system of the vehicle, preferably within the lower hose connection indicated at 16. A capillary tube 18 connects the bulb 10 with the interior of the bellows 12. The bulb, tube and bellows are charged with a small amount of liquid having a considerable vapor pressure, in such a manner that the assembly is on the vacuum side until an elevated temperature is reached. For example, the fill may be such as to have a vapor pressure equal to normal atmospheric pressure at say, 175° F. In that case the bellows assumes its free length at 175°. At all lower temperatures the pressure within the bellows is below atmosphere and the bellows is shorter than its free length. This procedure of charging bellows on the vacuum side is well-known in this art. The charge may comprise any suitable liquid such as alcohol or an alcohol-water mixture. To prevent the bellows from collapsing too much at low temperatures an internal stop 19 may be provided.

Figure 3:
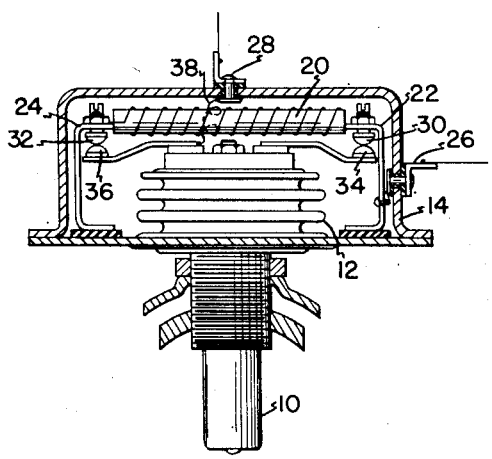

Received in the casing 14 is a resistor 20, preferably consisting of a simple wire-wound member. It is connected at opposite ends to fixed contact members 22 and 24 supported on but insulated from the casing. The contact 22 is electrically connected to a terminal 26. A second terminal 28 is mounted on the casing. The contact members 22 and 24 carry adjustable contact points 30 and 32 respectively. Attached to the top of the bellows are two movable contacts 34 and 36 adapted to engage the contacts 30 and 32 respectively as the bellows expands. Thus upon expansion of the bellows, contact 36 first engages contact 32, as shown in Fig. 2, and upon continued expansion, contact 34 engages contact 30, as shown in Fig. 3. Since the contact points 30 and 32 are adjustable the circuits may be established at any desired temperatures.

A flexible connection 38 leads from the top of the bellows to the terminal 28.

As shown in Fig. 1 the system includes a coupling unit designated generally at 43. The crank shaft 44 of the engine is connected through the coupling unit to the fan shaft 45 to drive the fan 46. The coupling unit is here shown in purely diagrammatic form because it may comprise any type of device for variably driving the crank shaft. For example it may comprise an electrical generator-motor unit, the motor speed being controlled by the resistor 20 in series with the armature. A simpler form of device is the usual electromagnetic slip coupling arrangement whereby as the flux is varied by the change of current the fan shaft is more or less tightly coupled to the driving shaft 44. In any event, regardless of the exact form of the electromagnetic coupling, it will be understood that a decrease of resistance in circuit produces an increase in speed of the fan driven by the crank shaft.

In operation, as the engine is started up from the cold condition, the parts are as shown in Fig. 1. The circuit to the coupling unit is open at 32, 36 and the fan is inoperative. This makes for a desirable rapid increase in water temperature. At an intermediate temperature, say about 150°, the bellows has expanded sufficiently to close contacts 32, 36 (Fig. 2). The circuit to the coupling unit is now completed through the resistor 20, and the fan runs at a low speed. If the temperature increases further, the bellows expands further until contact is made at 34, 30. This further expansion is permitted because of the flexibility of the contact 36; and if necessary the bellows will cock slightly to accommodate the expansion. When the contacts 34, 30 are closed, the resistor 20 is shunted out and the fan operates at full speed. This operation may be set to take place at some temperature between 165° and 175° F. This condition is shown in Fig. 3.

Under all operating conditions, the bellows responds to the water temperature and controls the resistor in a manner to provide for most satisfactory operation. Thus, for sustained high engine speeds, where full-speed operation of the fan is not necessary, the bellows will fall back to its intermediate position (Fig. 2) or may even open the fan circuit entirely.

In the event of a failure in the thermostatic system, as for example, a leak, whereby the internal vacuum is lost, the bellows simply expands to its free length, both sets of contacts are closed as in Fig. 3, and the fan is operated at full speed. This is the "fail-safe" feature whereby adequate cooling is insured, notwithstanding a failure of the control system.

It will be understood that the invention is not limited to the particular embodiment and arrangement of parts herein described, but may be varied within the scope of the appended claims. Furthermore, it will be understood that additional contacts may be provided, with connections to successively shunt out portions of the resistor whereby finer graduations of control may be attained.

Having thus described the invention, I claim:

1. In a thermostatic control system for an automotive fan, a thermostatic device including an expansible chamber, the chamber being charged with fluid under vacuum at temperatures below the operating range whereby the chamber is normally at less than its free length, a resistor, means operated by expansion of the chamber due to vapor pressure at increasing temperatures to reduce the resistance of the resistor, and means for shunting the resistor when the chamber is expanded to its free length at a predetermined temperature or through loss of vacuum in the chamber.

2. In a thermostatic control system for an automotive fan, a thermostatic device including an expansible chamber, the chamber being charged with fluid under vacuum at temperatures below the operating range whereby the chamber is normally at less than its free length, a resistor, contacts operated by expansion of the chamber to reduce the resistance of the resistor upon increasing temperature, and contacts to shunt the resistor when the chamber is expanded to its free length at a predetermined temperature or through loss of vacuum in the chamber.

JOHN E. WOODS.

REFERENCES CITED

The following references are of record in the file of this patent:

UNITED STATES PATENTS

| Number | Name | Date |
|---|---|---|
| 861,310 | Nolen | July 30, 1907 |
| 1,364,927 | Fulton | Jan. 11, 1921 |
| 2,019,058 | Rippe | Oct. 29, 1935 |
| 2,273,000 | Hans | Feb. 10, 1942 |
| 2,396,000 | Findley | Mar. 5, 1946 |
| 2,473,281 | Findley | June 14, 1949 |